March 22, 1960   J. A. LISOWSKI ET AL   2,929,487
TRANSFER APPARATUS
Filed Aug. 8, 1955   3 Sheets-Sheet 3
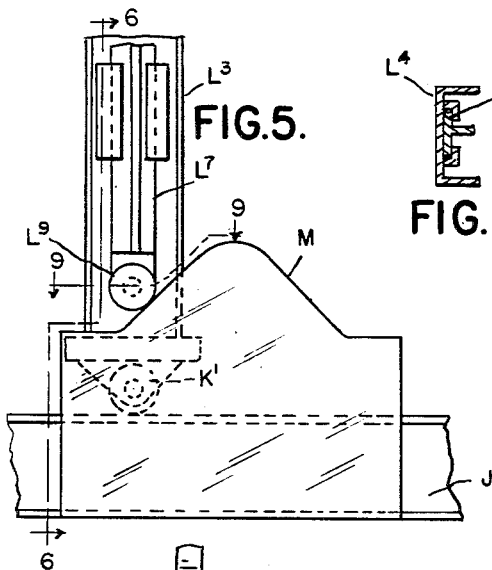
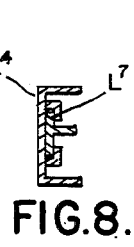
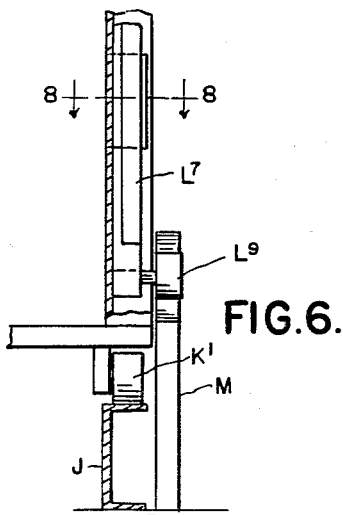
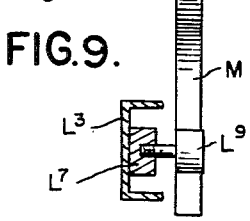
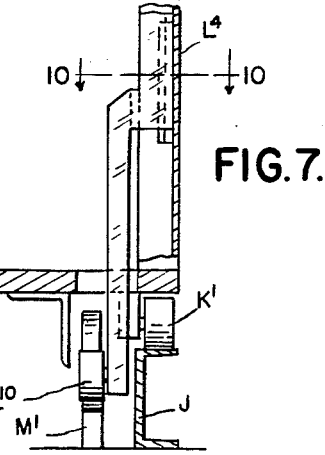
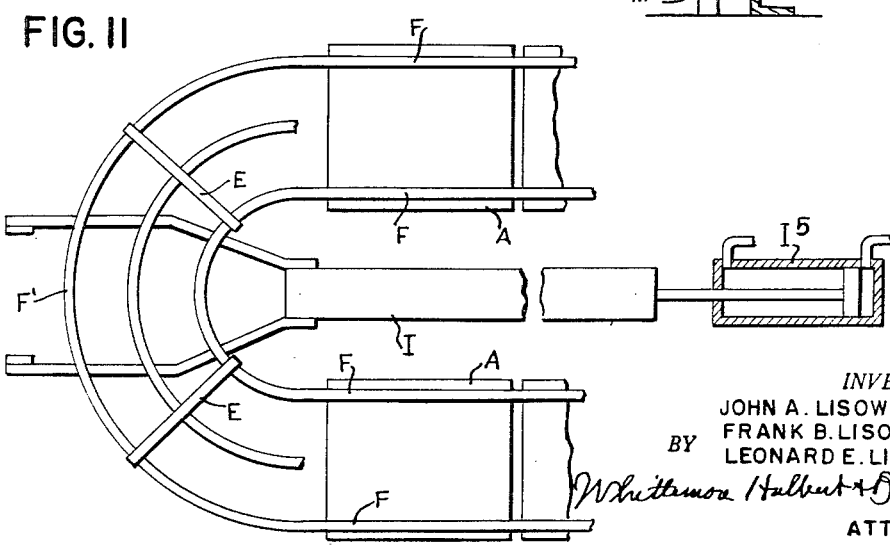
*INVENTORS*
JOHN A. LISOWSKI
FRANK B. LISOWSKI
LEONARD E. LISOWSKI
BY
ATTORNEYS

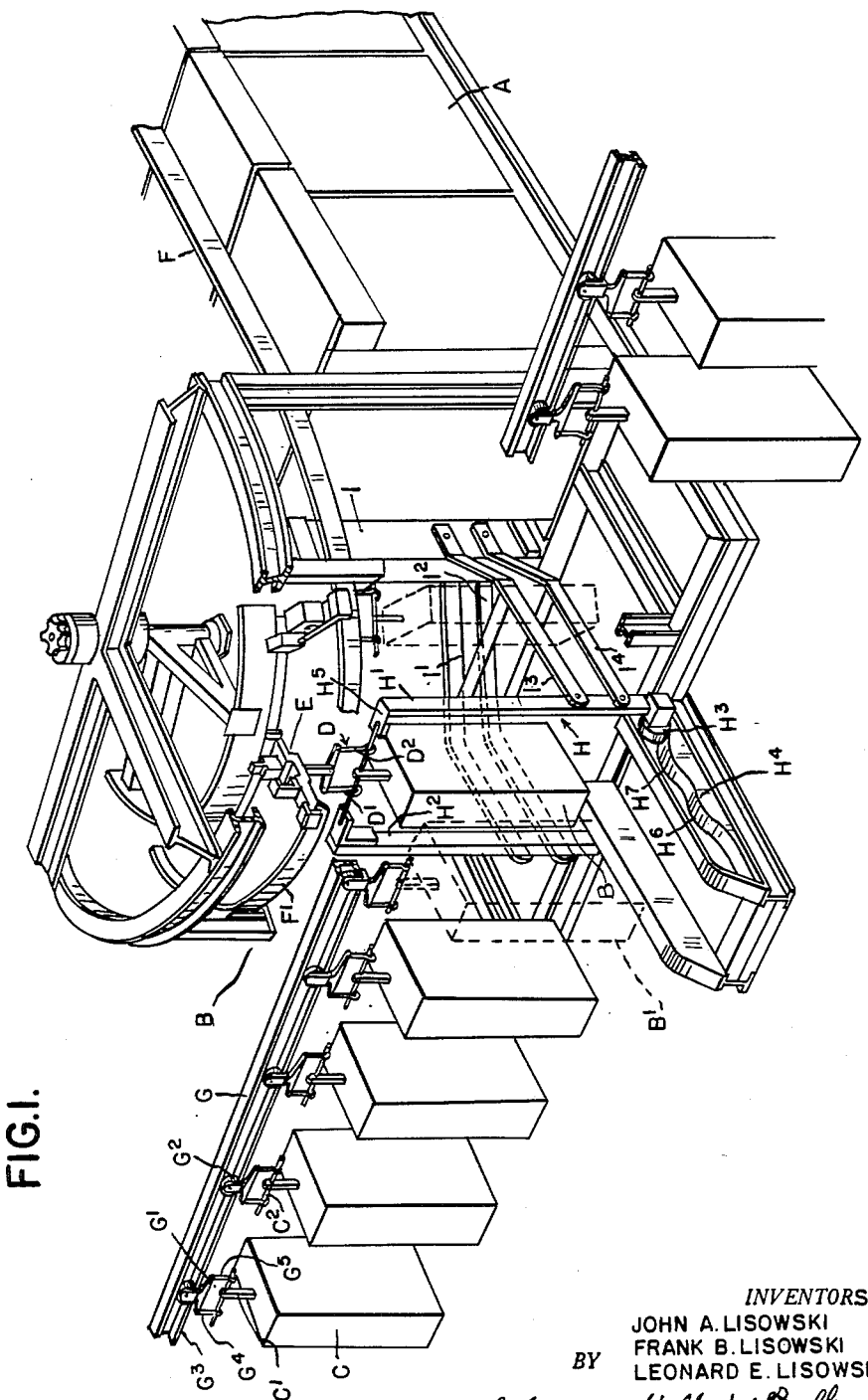

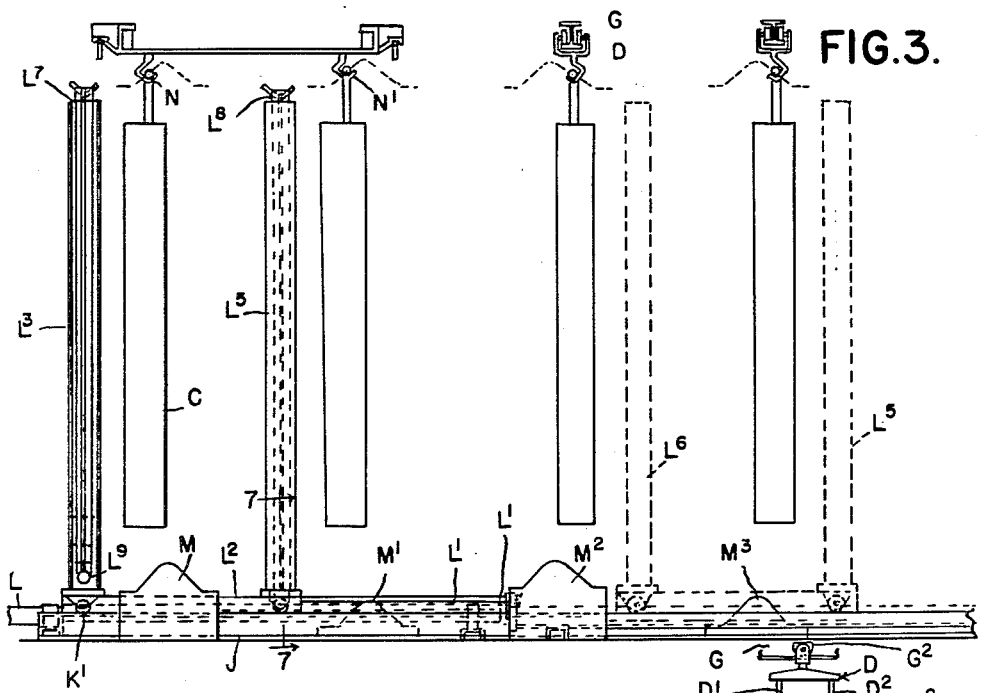
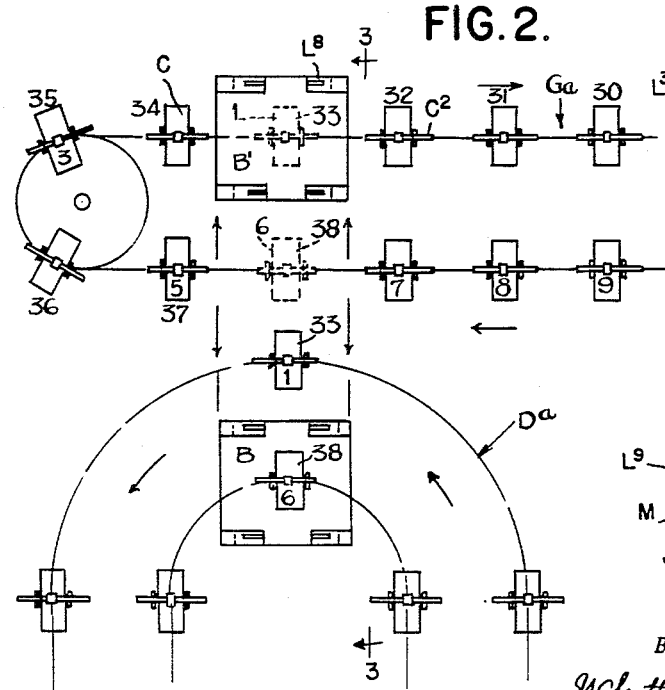
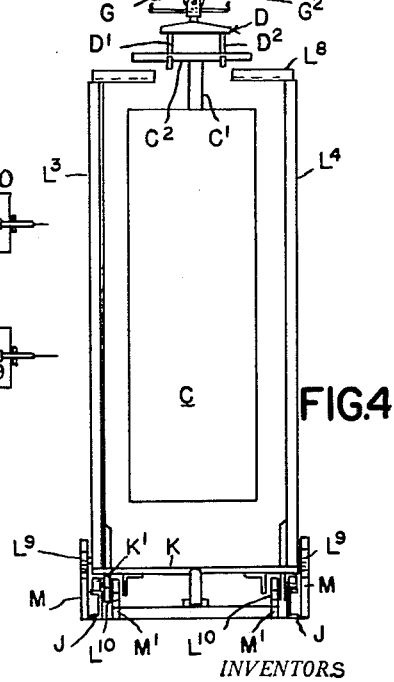

United States Patent Office 2,929,487
Patented Mar. 22, 1960

2,929,487

TRANSFER APPARATUS

John A. Lisowski, Frank B. Lisowski, and Leonard E. Lisowski, Detroit, Mich., assignors to Natural Products Company, Newport, Mich., a co-partnership Application August 8, 1955, Serial No. 527,114

8 Claims. (Cl. 198—20)

The invention relates to work processing apparatus of that type in which the work is successively advanced through a series of stations in each of which a step of the process is performed. More particularly the invention relates to apparatus of this type used in electroplating. This includes a series of tanks containing different treating fluids in which the work is successively immersed. It also includes a conveyor system for advancing the work from tank to tank together with work suspension means which is raised and lowered to permit passing from one tank to another. For convenience and also for economizing space the series of tanks is in two rows, the work passing in one direction through one row and returning through the other row to the starting point. Furthermore, the work may be carried by holders suspended in a single row or in a plurality of rows arranged side by side.

It is the object of the invention to provide means for automatically feeding the unprocessed work to the starting station of the apparatus and for removing the processed work after its return to such station. It is a further object to provide means for this purpose in which the work is fed to and is removed from the apparatus by different portions of a single conveyor. Still further, it is an object to obtain a construction in which the individual work holders are fed to and removed from the apparatus in which latter they are advanced either in a single row or in a plurality of rows arranged side by side. With these and other objects in view the invention consists in the construction as hereinafter set forth.

In the accompanying drawings:

Fig. 1 is a perspective view illustrating the work feeding and removing means as applied to an electroplating apparatus.

Fig. 2 is a plan view of a slightly modified construction.

Fig. 3 is a sectional elevation on line 3—3 of Fig. 2.

Fig. 4 is an end elevation of the construction shown in Fig. 3.

Fig. 5 is an elevation showing a portion of Fig. 1 drawn to a larger scale.

Fig. 6 is a sectional elevation substantially on line 6—6, Fig. 5.

Fig. 7 is a sectional elevation on line 7—7, Fig. 3.

Fig. 8 is a cross section on line 8—8, Fig. 6.

Fig. 9 is a cross section on line 9—9, Fig. 5.

Fig. 10 is a cross section on line 10—10, Fig. 7.

Fig. 11 is a plan view of the construction of apparatus as shown in Fig. 1.

The electroplating apparatus to which our invention is specifically applied will not be described in detail, but generally it comprises successive tanks A arranged in parallel adjacent rows with a station B at one end from which the work to be plated starts on its cycle and to which it returns when completed. The work is carried by holders C which in turn are suspended from hooked hangers D depending from cross bars E which normally rest on rails F above each tank. Elevator means (not shown) lift the bars E in passing from one tank to another so that the suspended work will clear the same. However, at the starting station these bars are at their low level and are supported by arcuate rails F' connecting the rails F in the two rows of tanks. In starting on the cycle the cross bars E are at the center of the arcuate rails F' where they are between the two rows of tanks. From this point they are advanced around said arcuate rails to the rails F over the first row of tanks and after returning through the second row traverse the arcuate rails F' to the original position.

Without further describing the plating apparatus, the specific construction of which forms no part of the instant invention, we will describe the means for feeding the suspended work holders to the starting point and for removing the plated work from said point.

The work holders are moved towards and away from the starting point respectively by different portions of a single conveyor, preferably supported by a monorail. This does not lead directly to the starting point on the plating apparatus but passes adjacent thereto so that a transfer carrier may transfer the work holders from the one to the other. We will first describe a construction shown in Fig. 1 for use in connection with plating apparatus in which the work holders are advanced from tank to tank in a single row. G is the monorail and G' are hooked hangers similar in construction to the hangers D and having trolley wheels $G^2$ for travelling on the rail G and a conveyor chain or cable $G^3$ connecting these hangers in suitable spaced relation to each other. The conveyor is operated intermittently to successively position the holders C at a point B' adjacent to the station B where they rest for an interval. H is a transfer carrier which travels transversely between the points B' and B and vice versa. Both the hangers D and G' have spaced depending hooks, respectively D', $D^2$ and $G^4$, $G^5$. The holders C, which may be of any suitable construction for carrying the work and exposing the same to the action of the treatment fluids, is in the drawings merely indicated as a rectangular body. Each holder has a T-head C', the horizontal portion $C^2$ of which is adapted for engagement with either of the pairs of hooks D', $D^2$ and $G^4$, $G^5$. The transfer carrier H in the construction illustrated in Fig. 1 is actuated by an intermittently reciprocated carriage I in turn actuated by a hydraulic motor $I^5$ and which forms part of the electroplating apparatus. Parallel pivotal links I', $I^2$, $I^3$ and $I^4$ extend outward from said carriage across the path of but below the work units suspended from the monorail. At their outer ends these links are connected to spaced uprights H', $H^2$ which are supported by rollers $H^3$ on a track $H^4$. Inwardly extending arms $H^5$ at the upper ends of the members H' and $H^2$ are adapted to engage the opposite end portions of the horizontal bar $C^2$ of the T-head C'. The track $H^4$ has upwardly extending cam portions $H^6$ and $H^7$ so positioned that when the uprights H' and $H^2$ travel over the cam $H^6$, the arms $H^5$ will lift the T-head of the work unit out of engagement with the hooks $G^4$ and $G^5$. The continued movement of the carrier will transfer the work unit towards the station B and the cam $H^7$ will deposit the bar $C^2$ into engagement with the hooks D' and $D^2$ of the hanger D. It is to be understood that the timing of the operation is such that an empty hanger D is in position at station B for receiving the transferred work unit prior to the completion of the operation just described. Also, that before return movement of the carrier by the carriage I and links, the hanger D which has received the work unit will be advanced and another hanger D which suspends a completely processed unit will be moved into the place thereof. Thus, during the return movement of the carrier, this processed unit will be transferred into engagement with the hooks $G^4$ and $G^5$ of the hanger G' from which the unprocessed unit was removed, said hanger having remained stationary in the same position until the processed unit is engaged therewith. In brief, unprocessed units will be advanced along the monorail G to the position B' and processed units will be advanced from the position B' to a position for the removal of the same.

In Figs. 2 to 4, inclusive, a modified construction is illustrated in which the unprocessed units advanced in single line series along the monorail G are successively transferred to the plating unit so as to be arranged side by side in a plurality of rows. This necessitates the movement of the conveyor chain or cable G³ in each step a distance equal to as many of the spaced suspended units as there are parallel rows. However, each step of the transfer carrier must simultaneously transfer as many units as there are rows and deposit the same in their respective rows. To accomplish this the monorail conveyor, instead of crossing the path of the transfer carrier at one point only, recrosses said path as many times as the number of rows. As illustrated, there are only two rows and consequently the conveyor crosses the path of the carrier only twice. Another factor of importance is that the number of suspended units in the conveyor between one point of crossing to the point of recrossing is such as to avoid registering the same unit at each point. On the contrary a unit at the first point of crossing will during its step by step advancement jump over the second point of crossing. At the same time the unit immediately adjacent and in rear of the unit at the first point of crossing will jump over that point and will be subsequently registered with the second point of crossing. Stated in another way, in a numbered series of units suspended from the conveyor the even numbers will register with one point of crossing and the odd numbers with the second point of crossing. For instance, taking the consecutive numbers 1 to 14, omitting 2 and 4, with the odd numbers in one crossing in alignment with the even numbers in the other crossing, all of the numbers in the single row conveyor will be transferred to the double row conveyor as follows:

```
1   3   5   7   9
6   8   10  12  14
```

If processed work is transferred back from the double row conveyor to the single row conveyor, other numbers which we have arbitrarily taken from 30 to 38 will be thus transferred. In Fig. 2, the numbers 1 to 9 are unprocessed work members on the single row conveyor to be transferred to the double row conveyor and numbers 30 to 38 in pairs on the double row conveyor are returned to the single row conveyor. The transfer carrier is also modified in construction and is preferably actuated by a separate motor unit from that that operates the mechanism in the plating apparatus. This will facilitate proper timing of the movements and will also simplify the construction. More in detail, the transfer carrier includes a pair of spaced straight rail tracks J and a carriage K for travelling therealong supported on rollers K'. The carriage is actuated by a fluid motor having a cylinder L and piston L', one attached to the carriage and the other anchored to the rails. The carriage has a frame or platform L² bridging the rails and columns rising therefrom to near the height of the monorail conveyor. These columns are arranged in pairs L³, L⁴ and L⁵, L⁶ and the space between pairs is equal to the space between the successive crossing portions of the conveyor. Each column has a member L⁷ slidably engaged therewith and extending from the bottom to above the top thereof. At the upper end of the members L⁷ constituting the same pair are inwardly horizontally extending channel arms L⁸ adapted to engage the opposite end portions of the horizontal portions C² of a T-head C'. The slides L⁷ at their lower ends have connected thereto rollers which in the travel of the carriage K along the tracks will engage cams M and M', causing vertical reciprocation in their respective columns. The members L⁷ in the columns L³ and L⁴ have rollers L⁹ located to engage the cams M and the members L⁷ in the columns L⁵ and L⁶ have rollers L¹⁰ for engaging the cams M'. These cams and rollers are arranged upon opposite sides of the columns so as not to interfere with each other, as shown in Figs. 6 and 7. The cams M and M' are so located with respect to the crossing planes of the conveyor portions as to simultaneously disengage units in each of said portions from their suspension hooks. These units may be thus transferred to the plating apparatus and a second pair of cams M² and M³ corresponding, respectively, to the cams M and M' function to deposit said units in engagement with hooks N and N' depending from a common hanger. These hooks N and N' are spaced on the hanger to produce the desired spacing between rows which, of course, corresponds to the spacing between crossing planes of the conveyor. The hooks of the hangers from the monorail have their open sides in the two crossings facing the same way while the hooks on the hangers in the plating apparatus have their open sides oppositely facing. This permits of removing units from the conveyor in the movement of the carriage between the row B' and the station B, depositing the removed units in the hooks of the hangers, and also in the reverse movement of the carriage of removing processed units from the apparatus and depositing them in engagement with the hooks in the respective cross points of the conveyor.

Each cycle in the transfer of work between the conveyors of the construction shown in Fig. 2 is as follows:

When both of the conveyors designated in Fig. 2, respectively as Gᵃ and Dᵃ, are stationary, the transfer carriage K is moved by its cylinder and piston motor L, L' to transfer a pair of work suspension holders 1 and 6 from conveyor Gᵃ to conveyor Dᵃ. The latter conveyor is then actuated to advance the holders 1 and 6 and replace them by holders having processed work 33 and 38. The carriage K is then returned to transfer 33 and 38 to the conveyor Gᵃ to occupy the space previously vacated by transfer of 1 and 6 to the conveyor Dᵃ. Finally the conveyor Gᵃ is operated to advance the holders 33 and 38 and to replace them by holders of unprocessed work. This completes the cycle which is successively repeated.

What we claim as our invention is:

1. In work processing apparatus including a conveyor for intermittently advancing work through a cycle from a starting station to return it processed to the same station, a second conveyor for supplying unprocessed work to the aforesaid first conveyor and also for receiving processed work therefrom, and a transfer carrier between said starting station and an adjacent station of said second conveyor; a series of spaced depending hooks on each of said conveyors for suspending work therefrom, and means on said transfer carrier for lifting work out of engagement with its suspension hook on the conveyor at one station and depositing it in engagement with a hook on the conveyor at the other station.

2. The construction as in claim 1 in which said carrier is reciprocated and in each direction of movement thereof initially disengages a suspended unit from its hook support and after transfer reengages it with another hook support.

3. The construction as in claim 2 in which the hooks from which said units are suspended in both said conveyors have their open sides facing each other, said carrier having lifting means thereon for raising the unit to disengage it from said hook and for lowering it into engagement with the other hook.

4. The construction as in claim 2 in which the hooks of both said conveyors have the open sides of one facing those of the other, the work lifting means on said carrier operating during transverse movement thereof.

5. In work processing apparatus including a conveyor for intermittently advancing work through a cycle from a starting station to return it processed to the same station, a second conveyor for supplying unprocessed work to the aforesaid first conveyor and also for receiving processed work therefrom, and a transfer carrier between said starting station and an adjacent station of said second conveyor; a series of spaced depending hooks on each of said conveyors for suspending work therefrom, and means on said transfer carrier for lifting work out of engagement with its suspension hook on the conveyor at one station and depositing it in engagement with a hook on the conveyor at the other station, the hooks of both said conveyors having the open sides of one facing those of the other, the work lifting means on said carrier operating during transverse movement thereof, and said carrier comprising a carriage supported on a track, a motor for reciprocating said carriage, spaced columns rising from said carriage, members slidable on said columns having lifting arms at their upper ends for engaging and suspending said units, and cams positioned to engage the lower ends of said slidable members at certain points in the travel of said carriage for elevating the same to disengage a unit from its former suspension and for lowering it to reengage the unit with another suspension.

6. In combination with work processing apparatus in which the work units are advanced through a cycle from a starting station to be returned processed to the same station; a conveyor for advancing suspended work units through a point adjacent to said station, a transfer carrier for said units from said point to said station and vice versa, and timing means by which said carrier is first, actuated to transfer an unprocessed work unit from said conveyor to said station, second, said apparatus operates to remove said transfer unit from said station and replace it by a processed unit, third, said carrier operates to transfer said processed unit from said station to said conveyor in the place vacated by removal of said unprocessed unit, fourth, said conveyor is operated to advance said processed unit, replacing it with a succeeding unprocessed unit, this completing a cycle, the work units in said processing apparatus being simultaneously advanced side by side in a plurality of rows, the units on said conveyor being uniformly spaced in a single line series, which, however, extend through a path having a plurality of successive portions equal in number to said rows and correspondingly spaced transversely crossing the path of said carrier, each step of advancement of said conveyor being equal to as many of said spaces as the number of said rows, and the number of spaces between successive points of crossing being such that successive adjacent units in the series will register with successive points of crossing, whereby said carrier will simultaneously transfer units from all crossing points to their respective rows in said apparatus.

7. The construction as in claim 6 in which the number of rows and also of said crossings is each two, and odd and even numbers in the series on said conveyor will respectively register with said points of crossing.

8. In work processing apparatus including an endless conveyor for intermittently advancing successive work units through a cycle from a position in a starting station to return them processed into the same position at the same station; a second conveyor for supplying unprocessed work units for the aforesaid first conveyor to an adjacent station and for also receiving at the latter processed work units from the aforesaid starting station, a transfer carrier between said stations, and means for operating said transfer carrier while both conveyors are stationary for shifting a work unit from said adjacent station to the said position at the starting station of the first conveyor and after one step of advancement of the latter bringing a processed work unit into the same position and while the second conveyor is still stationary shifting said advanced processed unit by said carrier through the same path into the vacated position in said second conveyor and means for then advancing said second conveyor to bring an unprocessed unit into position for repeating the cycle.

References Cited in the file of this patent

UNITED STATES PATENTS

| | | |
|---|---|---|
| 2,645,186 | Davis | July 14, 1953 |
| 2,682,946 | King | July 6, 1954 |
| 2,771,175 | Da Costa | Nov. 20, 1956 |
| 2,806,577 | Lang | Sept. 17, 1957 |